United States Patent [19]

Davis

[11] 4,029,332
[45] June 14, 1977

[54] ROTACYCLE

[76] Inventor: Harry C. Davis, 2 Elmwood Ave., Winchester, Mass. 01890

[22] Filed: June 10, 1975

[21] Appl. No.: 585,751

[52] U.S. Cl. .............................. 280/234; 280/236; 280/261; 74/194
[51] Int. Cl.² .................................... B62M 11/12
[58] Field of Search ......... 280/236, 237, 238, 260, 280/261, 234, 240, 200, 230; 74/194, 193, 192, 191

[56] References Cited

UNITED STATES PATENTS

| | | | |
|---|---|---|---|
| 622,758 | 4/1899 | Crutchfield | 280/260 |
| 707,872 | 8/1902 | Spaulding | 74/194 |
| 1,185,616 | 6/1916 | Bjorneby et al. | 74/194 |
| 1,462,809 | 7/1923 | Gill | 74/194 |
| 1,658,137 | 2/1928 | Neracher | 74/194 |
| 2,183,434 | 12/1939 | Smith | 74/197 |
| 3,873,128 | 3/1975 | Dunder et al. | 280/236 |

*Primary Examiner*—Joseph F. Peters, Jr.
*Assistant Examiner*—Terrance L. Siemens

[57] ABSTRACT

A foot propelled two-wheel-in-line vehicle having a two-wheel friction drive including a front drive epicyclic contra-rotating element, pedalled driving wheels, a pedal actuated rear wheel brake, and an automatic variable-speed transmission comprising a centrally disposed rotor in friction-tight contact with a plurality of pulley wheels normal thereto and radially traversing thereon, said wheels flexibly connected with mating wheels and with said epicyclic element in such manner as to impart torque to the perimeter of the cycle wheels.

4 Claims, 3 Drawing Figures

ROTACYCLE

BACKGROUND OF THE INVENTION

This invention relates to cycling vehicles generally and more particularly to a foot propelled cycle having a two-wheel drive, an automatic variable-speed transmission, and a pedal actuated rear wheel brake.

Although it is not intended that the invention be restrained in form or limited to a precise application, the cycle herein has been designed specifically for vehicular use and such purpose will be emphasized in this disclosure.

In the modern bicycle, higher speed and lower rolling friction are widely sought, yet its average speed is rated at approximately 12 mph. And although road friction will of course be reduced by use of narrow high pressure tires, shock absorbing is proportionally sacrificed, imposing discomfort upon the rider and excessive vibration upon the machine.

Many popular cycles are equipped with multiple sprockets and deraileurs involving complex contrivances, expensive to manufacture and to maintain. Unfortunately, these components must be installed off-center, necessitating on off-center rear wheel and an unaligned sprocket chain, thereby causing undue wear. Controls include an array of obstructive cables and protruding levers, the latter requiring diverted attention and manipulation which doubtfully synchronizes with or precisely relates to a desired operation, for no cycle road is level nor grade uniform. Further, manually operated caliper type brakes are only about 50 per cent effective when lubricated by moisture.

It is therefore among the principal objectives of this invention to provide a comparatively simple device capable of overcoming the difficulties stated above.

SUMMARY

A foot propelled two-wheel-in-line vehicular cycle having its pedals attached to dual driving wheels, said wheels rotating a centrally disposed disk and in reverse motion operating a rear wheel brake, a plurality of pulley wheels mounted normal to the diametral plane of said disk and traversing as well as rotating on both faces thereof in friction-tight contact, said pulley wheels flexibly connected with mating wheels so arranged as to rotate both cycle wheels including contra-rotating epicyclic gears providing constant torque during pivoting of the front wheel, an automatic variable-speed transmission wherein the radial loci of the disk pulley wheels are oriented with the angular velocity of the cycle wheels' perimeter at points of contact with said wheels' drivers.

BRIEF DESCRIPTION OF THE DRAWINGS

The foregoing and other objects, features and attendant advantages of the present invention will become apparent and understood upon consideration of a detailed description thereof and by reference to the related drawings wherein similar reference characters indicate similar parts and in which.

DESCRIPTION OF THE PREFERRED EMBODIMENT

Figure 1:
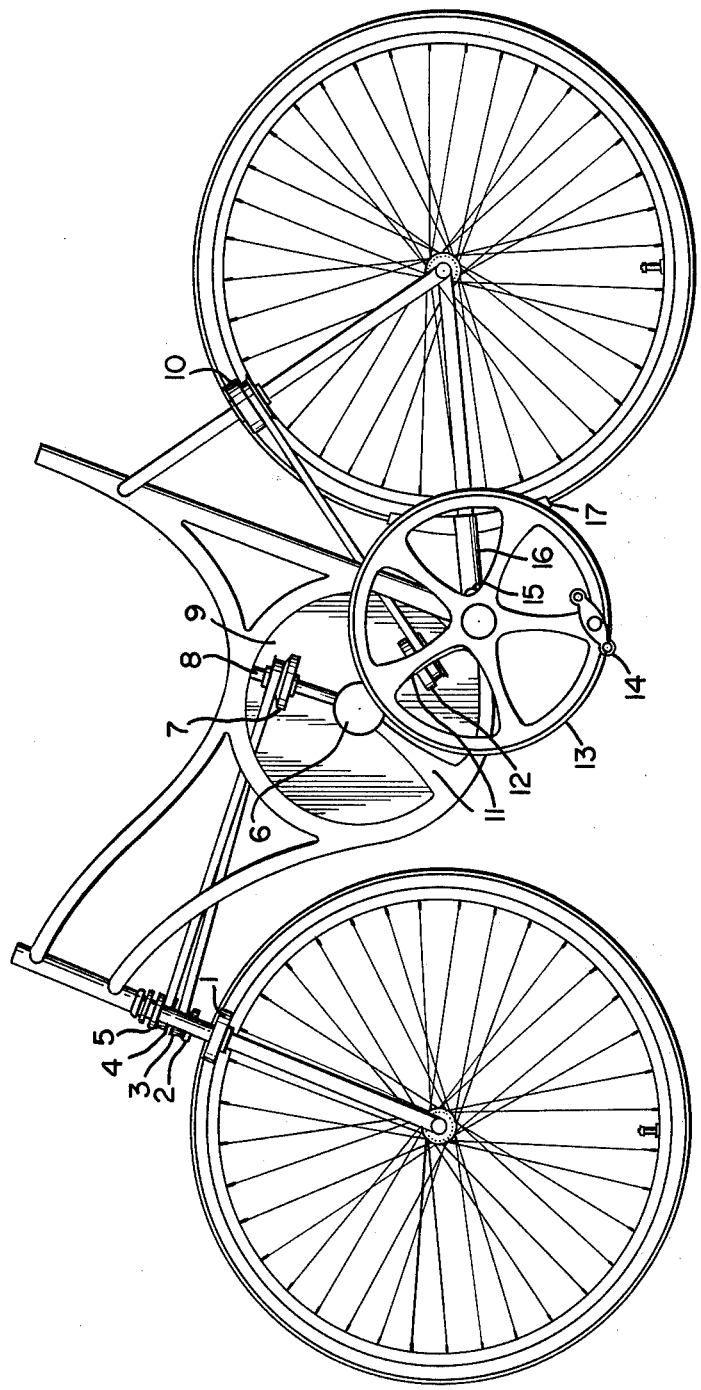
FIG. 1 is a side elevational view of the present invention.

Referring to FIG. 1 more specifically, and in the order of work, there is shown at 14 a foot pedal revolvably attached to the outer rimface of driving wheel 13. Said wheel and its counter-part (not shown) are rigidly mounted diametrically opposite on a shaft supported by the bottom bracket hanger. Said wheel has a laterally recessed, flanged rim and gears with wheel 6. Wheel 6 and disk 9 are mounted on a common shaft, said shaft revolving in stationary hubs supported by vertically convergent stanchions 11 integral with the mid-frame, said hubs also containing any suitable conventional means permitting pedal coasting.

Pulley wheels 7 and 12 are mounted on pressure rods non-coplanar parallel with the face of said disk in friction-tight contact. Said pulley wheels are flexibly connected (not shown) to wheels 4 and 10 respectively, wheel 4 being mounted on a fork stem extension (FIG. 2) and wheel 10 being mounted on a compressive seat stay. Pressure rod 8 is supported by disk 9, shaft hub and a top tube bridge.

Figure 2:
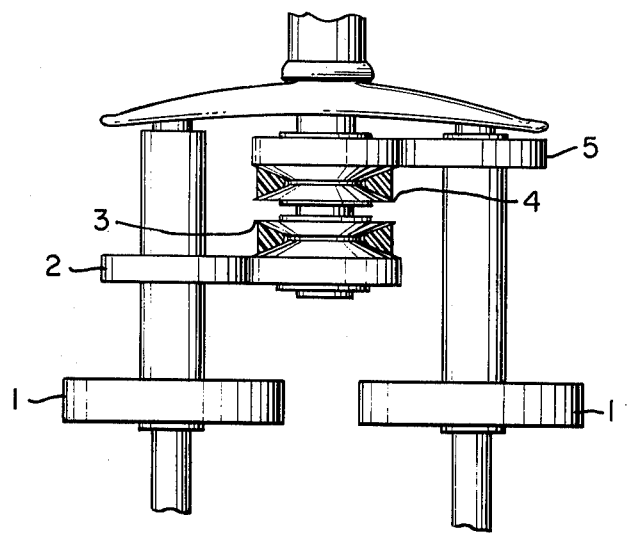
FIG. 2 is a front elevational view of the front wheel drive assembly.

Disk 9 and its contacting pulley wheels constitute an automatic variable-speed transmission in the following manner: As the front cycle wheel rpm. changes, pulley wheel 7 traverses on pressure rod 8, between convenient stops, until the radial locus of said wheel is oriented with the angular velocity of the front cycle wheel perimeter at a point of contact with unit wheel 1, said action continuing in infinite ratio modulation. Referring to FIG. 1, 2 and 5 illustrate integral sleeve and gear wheel units respectively mounted on the front cycle wheel compressive fork arms and rotating thereon in epicyclic relation with contra-rotating pulley wheels 3 and 4, said last mentioned wheels mounted in juxtaposition on a downward extension of the fork stem. The lower parts of said units straddle the tire of the cycle wheel in caliper fashion enabling normal friction-tight engagement of wheels 1 and the sidewalls of said tire. The fork shoulders are extended to partially shield said components and to serve as stops during pivoting of the front cycle wheel.

Figure 3:
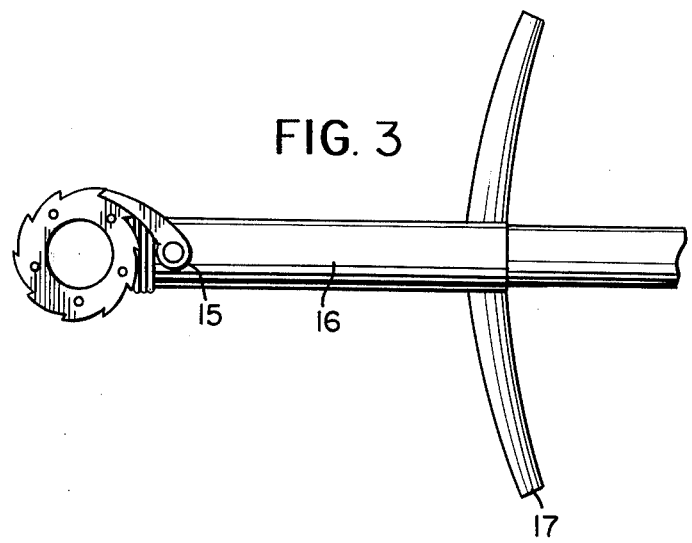
FIG. 3 is a side elevational view of the braking mechanism.

Referring to FIG. 3 there is shown a rear wheel brake assembly comprising a dual ratchet and pawl arrangement 15 having its ratchet rings firmly attached to the inner hubs of wheels 13 (FIG. 1) and its pawls, conventionally spring-loaded, turning on pinions integral with dual Teflon lined sleeves 16, a sleeve and brake block combination having its sleeves rigidly supporting a medially disposed block 17, and spring-loading positioning said block, said combination sliding on rear wheel stays in ratio to the resultant reverse pedal pressure.

The type and disposition of drive train bearings, preference of friction or toothed gearing, frictional facing, and protective shielding are unspecified, since no invention is claimed therein. Only those elements necessary to disclose the invention are shown and described herein.

OPERATION

It is well known to those skilled in the art that force causes rotary motion, yet force is not the sole factor determining the rotation of the wheel. Indeed, the method of application of the force is as important as the forces itself. Experience has shown that a rotative force is most effective when its line of application is perpendicular to a radius at the point of application and farthest from the center of rotation. Clearly, the present design finds affirmation in these fundamentals, relative to perimetral drive. Prior art further reveals that attempted operational smoothness of the vehicular cycle has been complicated by the almost continual varying of speed and load factors. However, this invention solves said problem by economy of motion, that is, by having the moment arm vary in unison with the speed and load change, said action achieved by provision of an automatic variable-speed transmission wherein the traversing element describes spirals of least resistance on the friction disk.

A most important teaching of the present invention is the wide distribution of propulsive force and the effect thereof. Now, the greater the number of driving components the less the compression, deformation and stress applied to the metallic structure. This is particularly relevant to the practical use of aluminum, or other very lightweight material in construction of the machine, especially in this type of vehicle, wherein the ratio of power to inertial drag is of much concern.

While 1 have shown and described a preferred embodiment of my invention by way of example, it is to be understood that modifications and variations therein may be made without departing from the spirit and scope of the invention as defined by the previous disclosure and by the appended claims.

I claim:

1. A foot propelled two-wheel-in-line vehicular cycle having a structure and comprising:
  A. a dual tubed mid-frame as means encompassing and supporting a rotor, said rotor being centrally disposed relative thereto,
  B. dual pedal attached driving wheels having a coupling shaft, said shaft revolving in the bottom bracket hanger as means supporting said driving wheels,
  C. said driving wheels as means transmitting motion to geared up wheels having a common shaft, said shaft revolving in stationary hubs, said hubs being respectively supported by vertically convergent stanchions, said stanchions being integrated with said mid-frame and said shaft medially mounting said rotor,
  D. said rotor constituting a friction disk, said disk being in operative contact with a plurality of pulley wheels equally allocated to both faces of said disk, said pulley wheels' plane of rotation being normal to said disk's plane of rotation,
  E. said pulley wheels capable of rotating and traversing on pressure rods, said rods non-coplanar and substantially parallel with said disk's diametral plane, said rods radially disposed relative to the axis of said disk, the inner termini of said rods conveniently mounted on the periphery of said shaft hubs and the outer termini of said rods conveniently mounted on a conventional top tube bridge and on the bottom bracket, and
  F. relative to said disk, a lower set of said pulley wheels flexibly connected by endless means to mating wheels mounted on compressive seat stays adjustable conveniently, said mating wheels being thus in friction-tight contact with the sidewalls of the tire as means rotating the rear cycle wheel,
  G. an upper set of said pulley wheels similarly connected as means oppositely driving mating wheels mounted on a fork stem extension.

2. A device in accordance with claim 1 and including:
  A. a front wheel drive assembly comprising:
    1. integral sleeve and gear wheel units respectively mounted on the front wheels's compressive fork arms adjustable conveniently, said units rotating thereon in epicyclic relation with said contra-rotating pulley wheels mounted in juxtaposition on a downward extension of the fork stem, said units as means providing constant torque during pivoting of the front wheel, the lower parts of said units straddling the tire in caliper fashion as means enabling normal friction-tight engagement of the lower unit wheels and the sidewalls of said tire as means rotating the front cycle wheel.

3. A device in accordance with claim 2 and including:
  A. an automatic variable-speed transmission comprising:
    1. said friction disk in operative contact with a plurality of pulley wheels normal thereto, rotatable thereby, and radially traversible thereon, said wheels oriented with the angular velocity of the cycle wheels' perimeter at points of contact with said wheels' drivers, causing said disk pulley wheels to describe spirals of least resistance on the faces of said disk as means providing infinite ratio modulation.

4. A device in accordance with claim 3 and including:
  A. a rear wheel brake assembly comprising:
    1. dual ratchet rings and pawls, said rings rigidly attached to the inner hubs of the pedalled driving wheels, and said pawls turning on pinions integral with dual Teflon lined sleeves respectively, said sleeves firmly supporting a brake block medially attached to said sleeves, said unit slidable on rear wheel stays, a tension spring capable of positioning said unit thereon, said brake being applied by resultant reverse pedal pressure and to the magnitude of said pressure as means retarding or stopping the forward motion of the vehicle.

* * * * *